(12) United States Patent
Han et al.

(10) Patent No.: US 8,859,127 B2
(45) Date of Patent: Oct. 14, 2014

(54) RACK HOUSING ASSEMBLY AND ENERGY STORAGE APPARATUS HAVING THE SAME

(75) Inventors: Jung-Yeop Han, Yongin-si (KR); Seung-Soo Jang, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 115 days.

(21) Appl. No.: 13/549,113

(22) Filed: Jul. 13, 2012

(65) Prior Publication Data

US 2013/0017428 A1    Jan. 17, 2013

(30) Foreign Application Priority Data

Jul. 14, 2011    (KR) ........................ 10-2011-0070026

(51) Int. Cl.
| | |
|---|---|
| H01M 2/10 | (2006.01) |
| H01M 10/50 | (2006.01) |
| H01M 10/6563 | (2014.01) |
| H01M 10/6556 | (2014.01) |
| H01M 10/6557 | (2014.01) |
| H01M 10/627 | (2014.01) |
| H01M 10/613 | (2014.01) |

(52) U.S. Cl.
CPC ........ *H01M 2/1077* (2013.01); *H01M 10/5067* (2013.01); *Y02E 60/12* (2013.01); *H01M 10/5057* (2013.01); *H01M 2220/10* (2013.01); *H01M 10/5059* (2013.01); *H01M 10/5018* (2013.01); *H01M 10/5004* (2013.01)
USPC ............. 429/120; 429/99; 429/100; 429/159; 312/223.1

(58) Field of Classification Search
USPC ................. 429/99, 100, 120, 159; 312/223.1; 361/679.46–679.5, 695
See application file for complete search history.

(56) References Cited

U.S. PATENT DOCUMENTS

| | | | | | |
|---|---|---|---|---|---|
| 5,490,572 | A | * | 2/1996 | Tajiri et al. | 180/65.1 |
| 5,585,204 | A | * | 12/1996 | Oshida et al. | 429/62 |

(Continued)

FOREIGN PATENT DOCUMENTS

| | | | |
|---|---|---|---|
| EP | 2 187 473 A1 | | 5/2010 |
| GB | 2460946 A | | 12/2009 |
| JP | 09289042 A | * | 11/1997 |
| JP | 2003-068266 A | | 3/2003 |

(Continued)

OTHER PUBLICATIONS

Korean Notice of Allowance dated Apr. 29, 2013 for Korean Patent Application No. KR 10-2011-0070026 which corresponds to captioned U.S. Appl. No. 13/549,133.

(Continued)

*Primary Examiner* — Gregg Cantelmo
(74) *Attorney, Agent, or Firm* — Knobbe, Martens, Olson & Bear, LLP

(57) ABSTRACT

An energy storage apparatus and a rack housing assembly having the same are disclosed. In one embodiment, the energy storage apparatus includes i) a plurality of battery trays arranged substantially parallel to each other so as to form at least one row and ii) a first duct located at a first side of the battery trays, wherein a plurality of first openings are formed in the first duct. The apparatus may further include i) a second duct located at a second side of the battery trays, wherein a plurality of second openings are formed in the second duct, and wherein the first and second sides are different from each other, ii) an air intake configured to forcibly intake air into the first duct and iii) an air exhaust configured to forcibly exhaust air from the second duct to the outside of the energy storage apparatus.

13 Claims, 5 Drawing Sheets

(56) References Cited

U.S. PATENT DOCUMENTS

| | | | |
|---|---|---|---|
| 5,806,948 A * | 9/1998 | Rowan et al. | 312/293.3 |
| 6,085,854 A * | 7/2000 | Nishikawa | 180/68.5 |
| 6,638,660 B2 | 10/2003 | Stone et al. | |
| 7,560,190 B2 | 7/2009 | Ahn et al. | |
| 7,618,740 B2 * | 11/2009 | Hamada et al. | 429/120 |
| 7,746,033 B2 * | 6/2010 | Lee et al. | 320/150 |
| 2002/0102454 A1 * | 8/2002 | Zhou et al. | 429/88 |
| 2005/0242774 A1 * | 11/2005 | Marraffa | 320/116 |
| 2006/0216582 A1 * | 9/2006 | Lee et al. | 429/120 |
| 2008/0026284 A1 * | 1/2008 | Fujii | 429/120 |

FOREIGN PATENT DOCUMENTS

| | | | |
|---|---|---|---|
| JP | 2003142166 A * | 5/2003 | |
| JP | 2005-243580 A | 9/2005 | |
| JP | 2010-3520 A | 1/2010 | |
| JP | 2010-123349 A | 6/2010 | |

OTHER PUBLICATIONS

Korean Office Action dated Oct. 24, 2012 for Korean Patent Application No. KR 10-2011-0070026 which corresponds to captioned U.S. Appl. No. 13/549,113.

* cited by examiner

RACK HOUSING ASSEMBLY AND ENERGY STORAGE APPARATUS HAVING THE SAME

RELATED APPLICATIONS

This application claims the benefit of Korean Patent Application No. 10-2011-0070026, filed on Jul. 14, 2011, in the Korean Intellectual Property Office, the disclosure of which is incorporated herein in its entirety by reference.

BACKGROUND

1. Field

The described technology generally relates to a rack housing assembly and an energy storage apparatus having the same.

2. Description of the Related Technology

Due to problems associated with environmental destruction, exhaustion of non-renewable fuel resources, and the like, there is an increasing demand for a system capable of efficiently using stored power. Also, there is an increasing demand for renewable energies such as tidal power, wind power, solar power, and the like, which do not cause environmental pollution during power generation. An energy storage apparatus may make more efficient use of power generated from renewable energy, a power storing battery, and existing power sources connected to each other.

For example, the energy storage apparatus may be used as an uninterruptible power supply for supplying emergency operating power or may provide power to industrial facilities when a main power source is interrupted.

SUMMARY

One inventive aspect is a rack housing assembly and an energy storage apparatus having the rack housing assembly that may accept battery trays and may efficiently cool the battery trays.

Another aspect is an energy storage apparatus, which includes a plurality of battery trays arrayed in parallel so as to form at least one row; a first duct comprising first openings that are formed at positions corresponding to the plurality of battery trays; a second duct comprising second openings that are formed at positions corresponding to the plurality of battery trays; an air intaking member for forcibly intaking external air into the first duct; and an air exhausting member for forcibly exhausting air from the second duct to outside.

The first duct and the second duct may be disposed in parallel with each other while having the at least one row of the plurality of battery trays arranged therebetween.

The first duct and the second duct may be disposed to be adjacent to the plurality of battery trays.

The first duct may be disposed below the at least one row of the plurality of battery trays, and the second duct may be disposed above the at least one row of the plurality of battery trays.

The first openings and the second openings may face each other while having the plurality of battery trays arranged therebetween.

Each of the plurality of battery trays may include a first hole formed to face one of the first openings; and a second hole formed to face one of the second openings.

The one of the first openings and the first hole may have substantially the same size.

The one of the second openings and the second hole may have substantially the same size.

Each of the plurality of battery trays may have closed surfaces except for surfaces of the first hole and the second hole.

Another aspect is a rack housing assembly, which includes accepting spaces formed in a row, and formed along a single direction so as to accept a plurality of battery trays; a first duct disposed at one side of the row of the accepting spaces, and comprising first openings that are formed at positions corresponding to the accepting spaces; a second duct disposed at another side of the row of the accepting spaces, and comprising second openings that face the first openings; an air intaking member for forcibly intaking external air into the first duct; and an air exhausting member for forcibly exhausting air from the second duct to outside.

The first duct and the second duct may be disposed in parallel with each other while having the row of the accepting spaces arranged therebetween.

The first duct may be disposed below the row of the accepting spaces, and the second duct may be disposed above the row of the accepting spaces.

The height of the accepting spaces may be substantially the same as the height of the plurality of battery trays.

The size of the first openings and the size of the second openings may be the same.

The first openings and the second openings may be open toward the accepting spaces.

Another aspect is an energy storage apparatus comprising: a plurality of battery trays arranged substantially parallel to each other so as to form at least one row; a first duct located at a first side of the battery trays, wherein a plurality of first openings are formed in the first duct; a second duct located at a second side of the battery trays, wherein a plurality of second openings are formed in the second duct, and wherein the first and second sides are different from each other; an air intake configured to forcibly intake air into the first duct; and an air exhaust configured to forcibly exhaust air from the second duct to the outside of the energy storage apparatus.

In the above apparatus, the first and second ducts are disposed substantially parallel with each other, and wherein the battery trays are interposed between the first and second ducts. In the above apparatus, the first and second ducts are disposed to be adjacent to the battery trays. In the above apparatus, wherein the first and second sides are opposing each other. In the above apparatus, the first duct is disposed below the at least one row of the battery trays, and wherein the second duct is disposed above the at least one row of the battery trays.

In the above apparatus, the battery trays are interposed between the first and second openings. In the above apparatus, first and second holes are formed in each of the battery trays, wherein the first hole faces one of the first openings, and wherein the second hole faces one of the second openings. In the above apparatus, the first opening and the first hole have substantially the same size. In the above apparatus, the second opening and the second hole have substantially the same size. In the above apparatus, each of the battery trays has closed surfaces except for surfaces of the first and second holes.

Another aspect is a rack housing assembly comprising: accepting spaces formed in a row along a direction so as to accept a plurality of battery trays; a first duct disposed at a first side of the row of the accepting spaces, wherein a plurality of first openings are formed in the first duct; a second duct disposed at a second side of the row of the accepting spaces, wherein the first and second sides are different from each other; an air intake configured to forcibly intake air into the first duct; and an air exhaust configured to forcibly exhaust air from the second duct to the outside of the rack housing assembly.

In the above assembly, the first and second ducts are disposed substantially parallel with each other, and wherein the accepting spaces are interposed between the first and second ducts. In the above assembly, the first duct is disposed below the row of the accepting spaces, and wherein the second duct is disposed above the row of the accepting spaces. In the above assembly, the height of the accepting spaces is substantially the same as the height of the battery trays. In the above assembly, the size of the first openings and the size of the second openings are substantially the same. In the above assembly, the first and second openings are open toward the accepting spaces.

Another aspect is an energy storage apparatus comprising: a plurality of battery trays arranged in a first direction; a first duct located at a first side of the batteries, wherein a plurality of first openings are formed in the first duct; and a second duct located at a second side of the batteries, wherein a plurality of second openings are formed in the second duct, wherein the first and second sides are different from each other, wherein at least one of the first openings is substantially aligned, in a second direction, with i) at least one of the second openings and ii) at least one of the battery trays, and wherein the second direction crosses the first direction.

The above apparatus, further comprising: an air intake configured to provide air into the first duct; and an air exhaust configured to exhaust air from the second duct to the environment. In the above apparatus, the air intake and air exhaust are located on the same side of the battery trays. In the above apparatus, the air intake and air exhaust are located on opposite sides of the battery trays.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Embodiments will now be described more fully with reference to the accompanying drawings. The disclosed embodiments are merely examples and are not considered limiting. Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components, and/or groups thereof. While terms "first" and "second" are used to describe various components, the components are not limited to the terms "first" and "second". The terms "first" and "second" are used only to distinguish between each component.

In the detailed description, a 'row of accepting spaces RG' indicates a plurality of accepting spaces G that are disposed substantially parallel to each other along one direction. For example, the row of accepting spaces RG may be formed in a D1 direction of FIG. 2. In the detailed description, a 'row of battery trays RB' indicates a state in which battery trays 100 are respectively accepted in the accepting spaces G arranged in the row of accepting spaces RG, and indicates that the battery trays 100 are disposed substantially parallel to each other along one direction. Thus, the row of battery trays RB may also be formed in the D1 direction.

Also, in the detailed description, 'external air' indicates air that has not yet flowed into a first duct 210, 'first air' indicates air that has flowed into the first duct 210 or an energy storage apparatus 1 and that has not yet passed through the battery trays 100, and 'second air' indicates air that has passed through the battery trays 100 and that is flowing inside a second duct 220.

Figure 1:
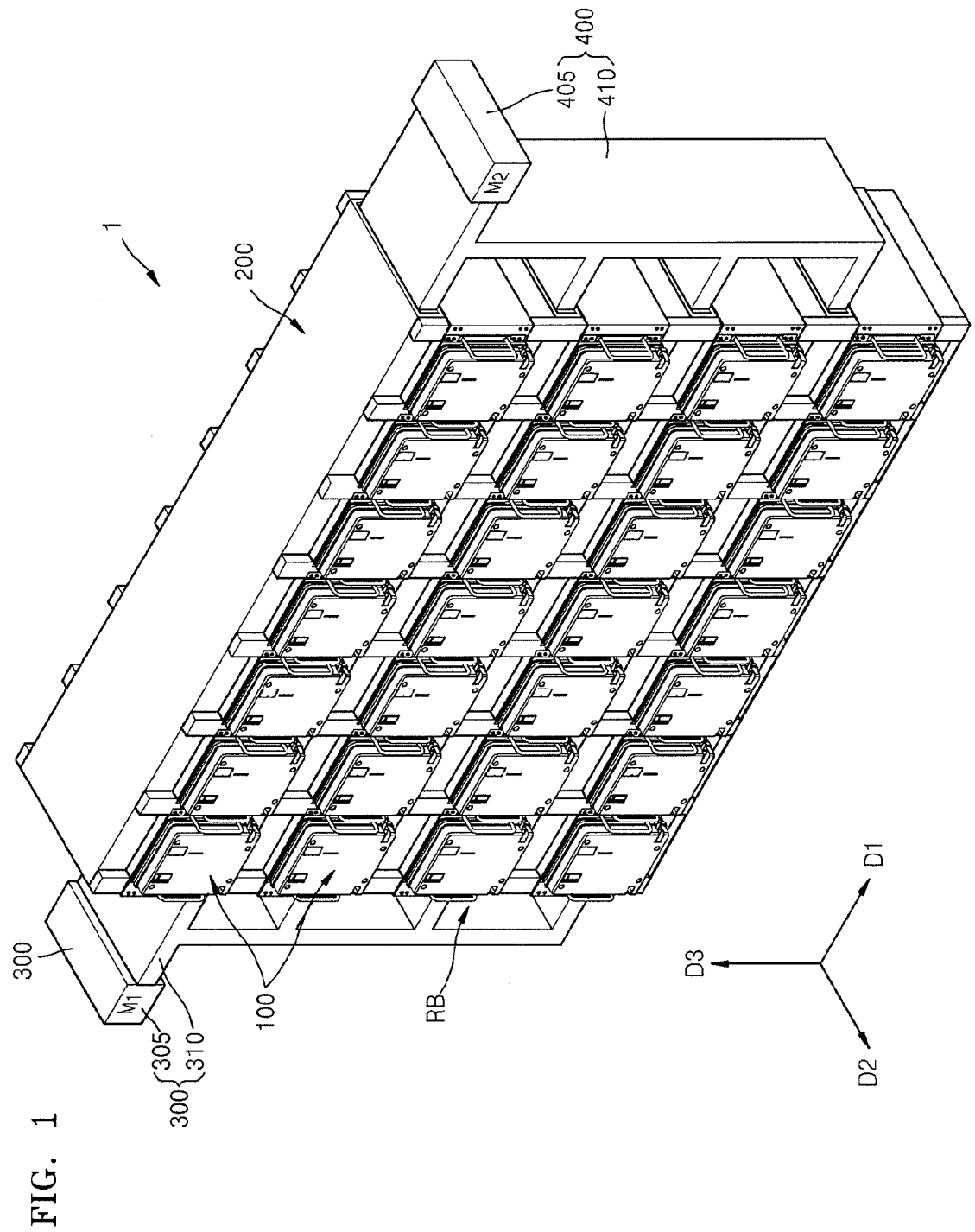
FIG. 1 is a perspective view illustrating an energy storage apparatus according to an embodiment.
Figure 2:
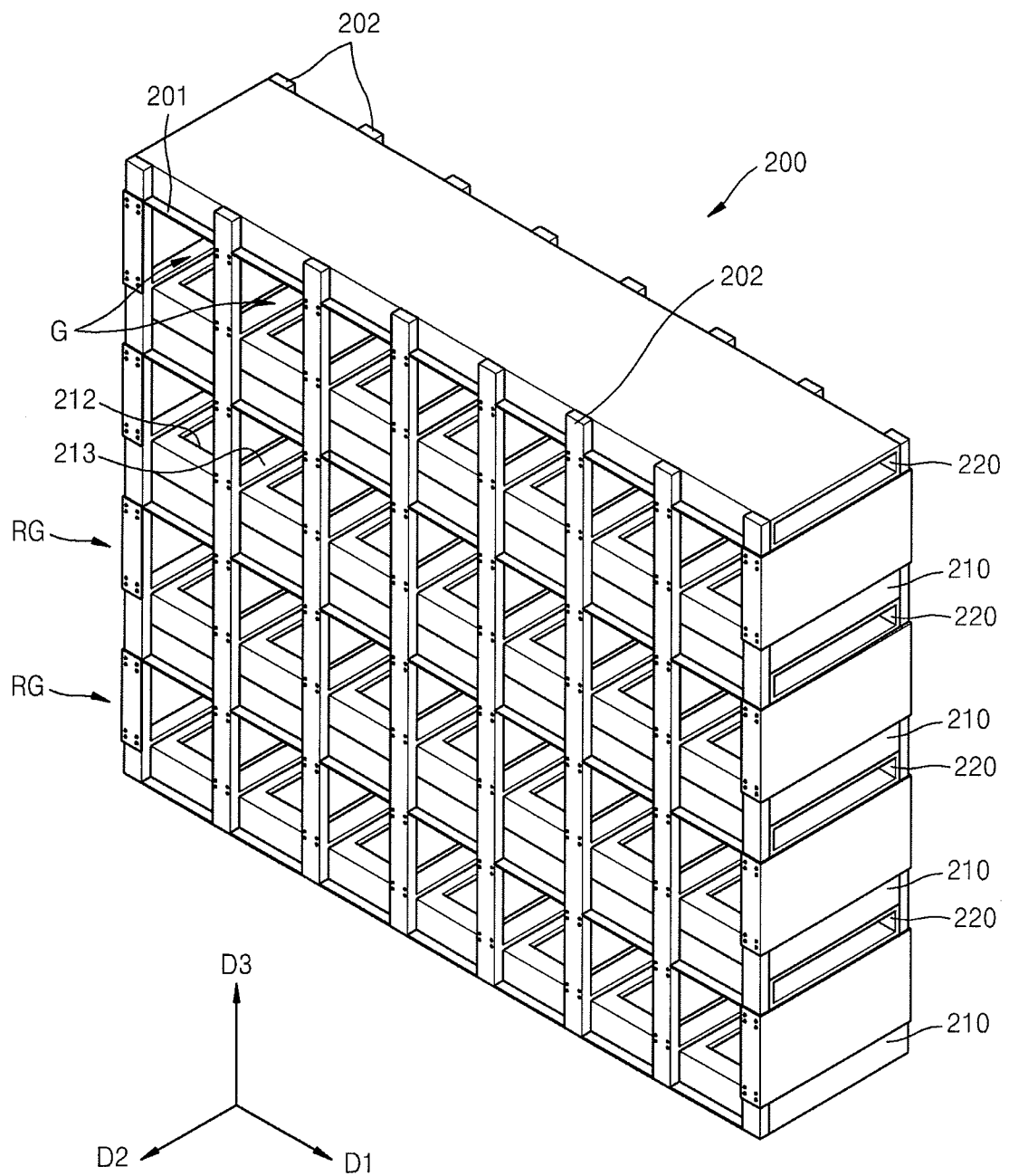
FIG. 2 is a perspective view illustrating a rack housing according to an embodiment.
Figure 3:
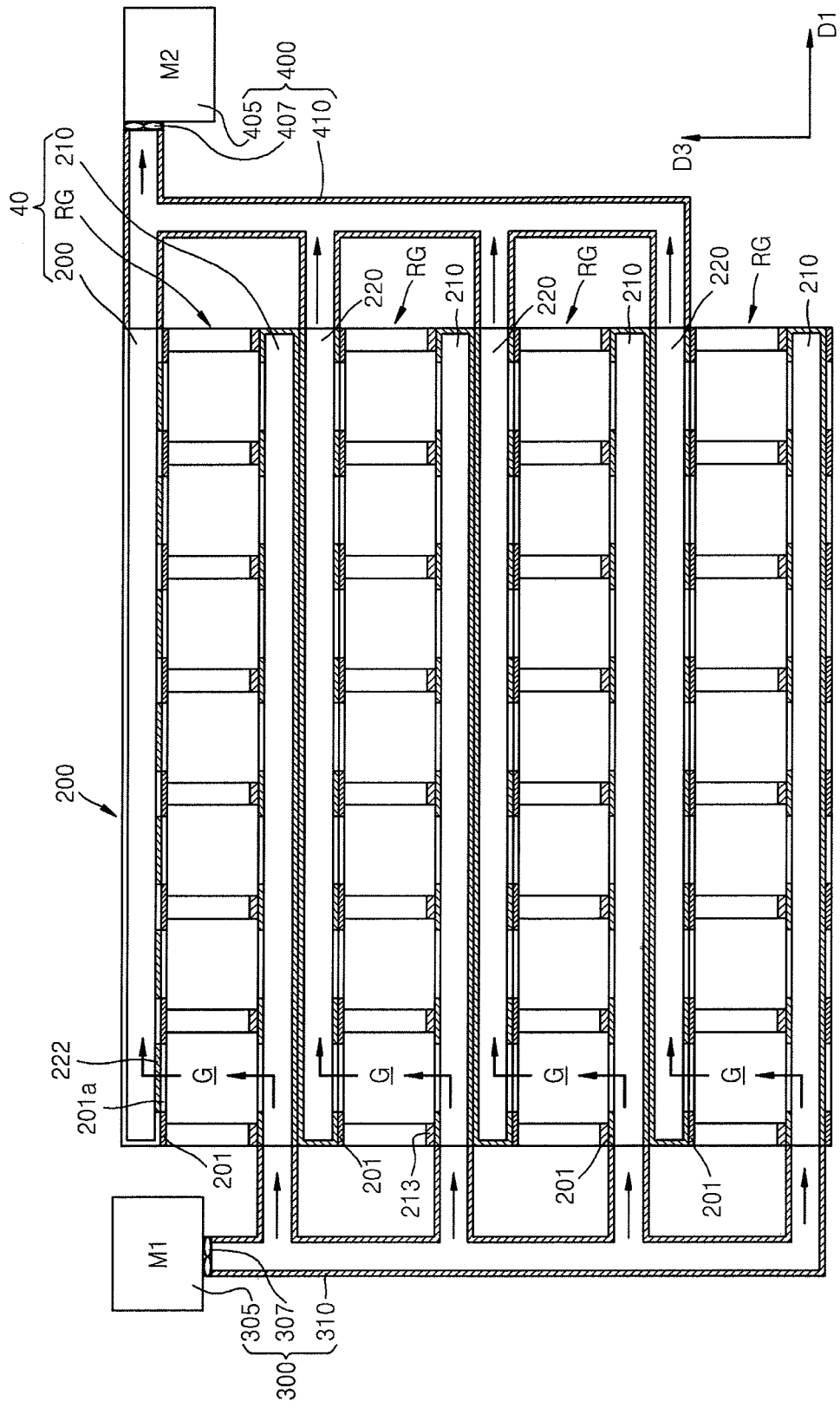
FIG. 3 is a cross-sectional view of a rack housing assembly formed by combining the rack housing, an air intaking member, and an air exhausting member.

FIG. 1 is a perspective view illustrating the energy storage apparatus 1 according to an embodiment. FIG. 2 is a perspective view illustrating a rack housing 200 according to an embodiment. FIG. 3 is a cross-sectional view of a rack housing assembly formed by combining the rack housing 200, an air intaking member (or air intake) 300, and an air exhausting member (or air exhaust) 400.

Each battery tray 100 includes a plurality of batteries (not shown) that are packed together and then modularized. The battery trays 100 may be connected in series and in parallel. The battery trays 100 connected in series and in parallel may be electrically connected to a battery management system (BMS) (not shown) for collectively controlling the battery trays 100.

The batteries in each battery tray 100 may have a substantially flat shape and are stacked in one direction. Each battery tray 100 may include a terminal (not shown) for outputting a discharge current to an external load (not shown) or for receiving a charge current from an external power supply (not shown).

The rack housing 200 may provide a space for accepting the battery trays 100 and may provide a connector (not shown) for connecting power between the battery trays 100 and for data or signal communication between the battery trays 100. In order to provide a flow path of air to cool the battery trays 100, the rack housing 200 may include the first duct 210 and the second duct 220. Each of the first and second ducts 210 and 220 may be connected to the air intaking member 300 and the air exhausting member 400 to form the rack housing assembly.

The rack housing 200 may be formed by combining a horizontal frame unit 201 and a vertical frame unit 202 that form a lattice shape frame of the rack housing 200. Furthermore, the first and second ducts 210 and 220 are disposed substantially parallel with the horizontal frame unit 201. The horizontal frame unit 201 may fix the second duct 220 so that the second duct 220 may maintain a predetermined distance with respect to the first duct 210 disposed below the second duct 220.

The horizontal and vertical frame units 201 and 202, and the first and second ducts 210 and 220 may be combined with each other via welding or other coupling methods where the units 201 and 202 are not easily detachable from the ducts 210 and 220. Alternatively, the connection of the two frame units 201 and 202, and the ducts 210 and 220 may be achieved via a mechanical manner such as screw-coupling so that the coupling may be released.

The rack housing 200 provides the accepting spaces G so as to accept the battery trays 100. The accepting spaces G may be formed in a row in the D1 direction, and a plurality of the rows of accepting spaces RG may be disposed in a D3 direction to form a plurality of rows.

The accepting spaces G may be defined by a plurality of the vertical frame units 202 and barriers 213 disposed between facing vertical frame units 202. Each accepting space G may have a cubic shape having four open side surfaces. Alternatively, only one of the four side surfaces of each accepting space G may be open. The battery trays 100 may be accepted in the accepting spaces G via one of the open side surfaces.

In one embodiment, the first and second ducts 210 and 220 are alternately stacked. For example, the two ducts 210 and 220 are disposed below and above the row of accepting spaces RG. Furthermore, the first duct 210 may support the battery trays 100 from below and may provide a flow path in which the first air flows, and the second duct 220 may support the battery trays 100 from above and may provide a flow path in which the second air flows.

The first duct 210 may have a first opening 212 in a surface corresponding to the accepting spaces G. The first air flowing in the first duct 210 may flow toward the battery trays 100, which are mounted in the accepting spaces G, via the first opening 212.

The air intaking member 300 (see FIG. 1) may intake external air (e.g., air from the environment) into the first duct 210. To do so, the air intaking member 300 may include a motor 305, a fan 307 (see FIG. 3) rotated by the motor 305, and a first auxiliary duct 310 for guiding air into a plurality of the first ducts 210, wherein the air flows due to operations of the motor 305 and the fan 307. In the present embodiment, the external air substantially simultaneously flows into the first ducts 210 via the first auxiliary duct 310. In another embodiment, one air intaking member 300 may be connected to one first duct 210.

The second duct 220 may be disposed to face the first duct 210 while having the accepting spaces G interposed therebetween. The second duct 220 may face the first opening 212 and may include a second opening 222 having substantially the same size as the first opening 212. The second air having passed through the battery trays 100 may flow into the second duct 220 via the second opening 222.

The air exhausting member 400 exhausts the second air from the second duct 220. To do so, the air exhausting member 400 may include a motor 405, a fan 407 rotated by the motor 405, and a second auxiliary duct 410 for exhausting the second air by operations of the motor 405 and the fan 407, wherein the second air has flowed into a plurality of the second ducts 220. In the present embodiment, the second air flowed into the second ducts 220 is substantially simultaneously exhausted via the second auxiliary duct 410 In another embodiment, one air exhausting member 400 may be connected to one second duct 220.

In one embodiment, as shown in FIGS. 1 and 3, the first and second ducts 210 and 220 are separate from each other by a height of the battery trays 100. In this embodiment, the height of the accepting spaces G is substantially the same as the height of the battery trays 100.

The first and second openings 212 and 222 are formed in the first and second ducts 210 and 220, respectively. In one embodiment, although the first air having flowed into the first duct 210 by the air intaking member 300 flows toward the accepting spaces G via the first opening 212, the first air does not flow toward the second duct 220 because the accepting spaces G are open. However, since the height of the accepting spaces G is substantially the same as the height of the battery trays 100, when the battery trays 100 are mounted in the accepting spaces G, the first and second openings 212 and 222 may be in fluid communication with the battery trays 100 and thus a closed-loop may be formed.

Accordingly, the first air having flowed into the first duct 210 may cool the battery trays 100 by flowing into the battery trays 100 via the first opening 212, and the second air having passed through the battery trays 100 may flow into the second duct 220 via the second opening 222 and then may be exhausted to the outside of the energy storage apparatus 1 or to the environment via the air exhausting member 400. Arrows of FIG. 3 indicate flows of the first air and the second air while the battery trays 100 are mounted.

Hereinafter, a detailed description will now be provided with reference to FIGS. 4 and 5 so as to describe a state in which the battery trays 100 are accepted and thus a closed-loop where air may flow is formed.

Figure 4:
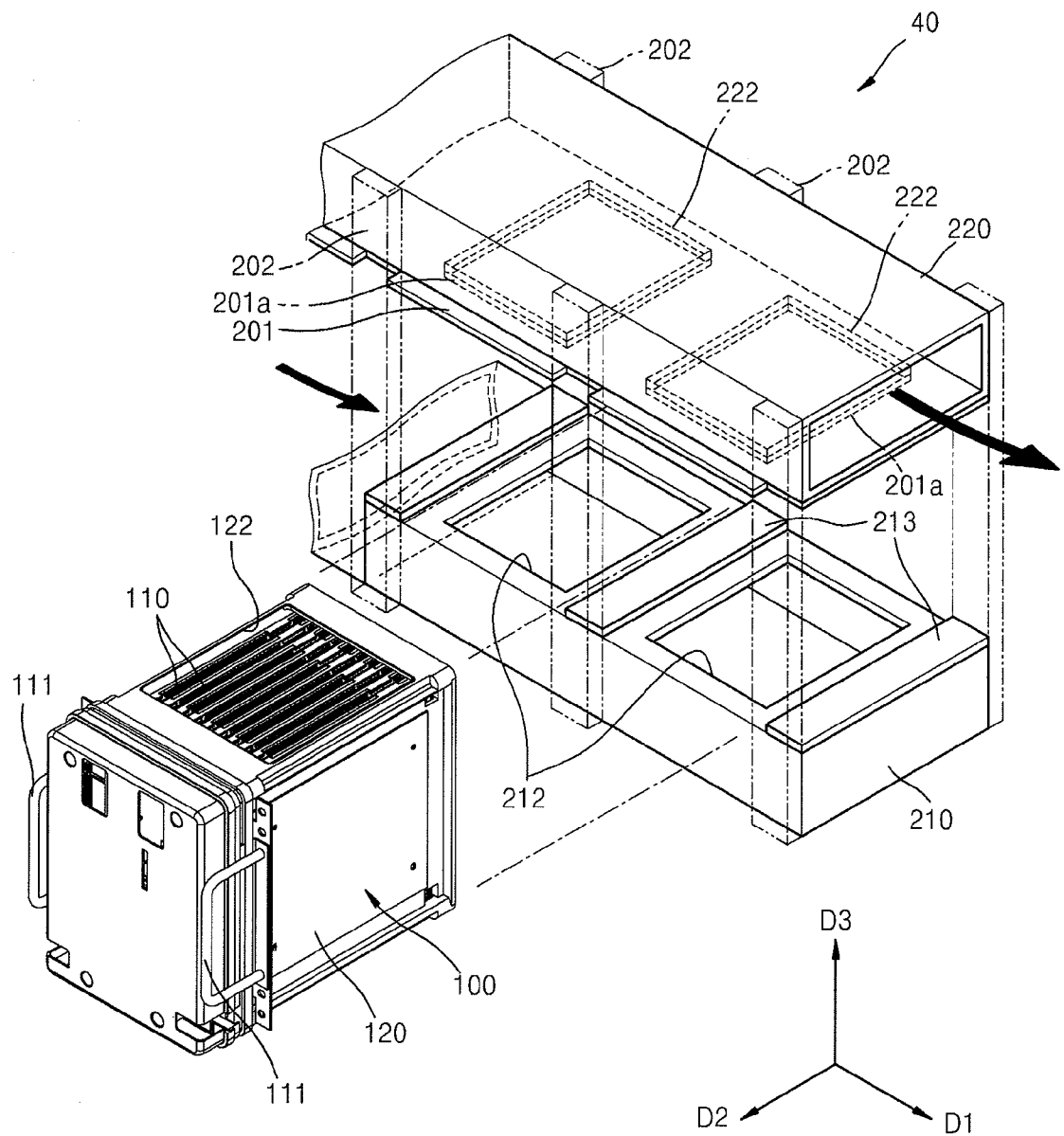
FIG. 4 is a perspective view illustrating a unit energy storage apparatus, that is, one row of the energy storage apparatus, according to an embodiment.

FIG. 4 is a perspective view illustrating a unit energy storage apparatus 40, that is, one row of the energy storage apparatus 1, according to an embodiment. FIG. 5 illustrates a flow of air that flows in the unit energy storage apparatus 40, that is, one row of the energy storage apparatus 1.

Figure 5:
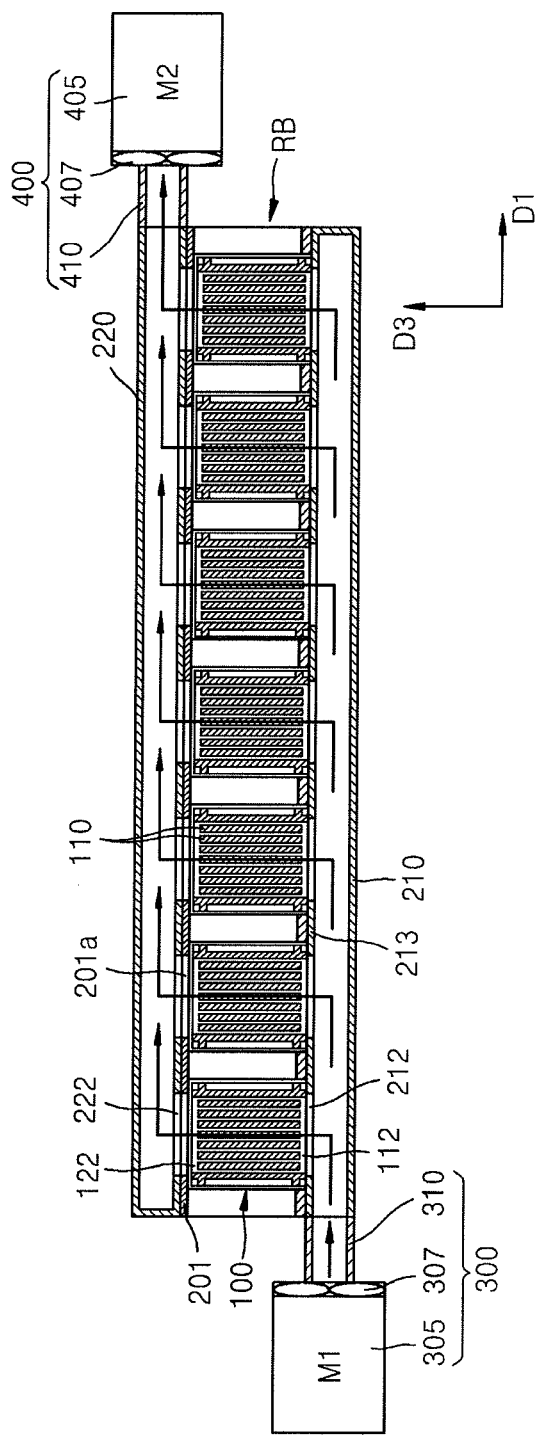
FIG. 5 illustrates a flow of air that flows in the unit energy storage apparatus, that is, one row of the energy storage apparatus.

Referring to FIGS. 4 and 5, the unit energy storage apparatus 40 includes a row of battery trays RB, and the first and second ducts 210 and 220 disposed substantially parallel with the row of battery trays RB arranged therebetween.

The first duct 210 may be disposed below the row of battery trays RB, and the second duct 220 may be disposed above the row of battery trays RB so as to face the first duct 210. Here, as described above, the distance between the first and second ducts 210 and 220 is substantially the same as the height of the battery trays 100.

In one embodiment, the first and second openings 212 and 222 are disposed to face each other, and the battery trays 100 are accepted between the two openings 212 and 222. The second duct 220 may be supported by the horizontal frame unit 201, and in order to allow the second air, which has passed through the battery trays 100, to flow into the second duct 220, the horizontal frame unit 201 may have a hole 201a having substantially the same size as the second opening 222.

Each battery tray 100 includes batteries 110 that are disposed substantially parallel along the D1 direction, and a tray housing 120 that accepts the batteries 110. The tray housing 120 has a cubic shape, and has a first hole 112 and a second hole 122 that are formed on a lower surface and an upper surface of the tray housing 120, respectively. In order to prevent the first air or the second air from flowing toward a path other than the first and second holes 112 and 122, all surfaces of the tray housing 120 other than the two holes 112 and 122 may be closed surfaces.

The first hole 112 may correspond to the first opening 212 so as to allow the first air, which has passed through the first opening 212, to flow into the battery trays 100. Here, in order to allow the first air to flow into the battery trays 100 without a leakage (or a substantial leakage) of the first air, the size of the first hole 112 may be substantially the same as the size of the first opening 212.

The second hole 122 may correspond to the second opening 222, so that the second air, which has absorbed heat while flowing through the battery trays 100, may flow into the second duct 220. Here, in order to allow the second air to flow into the second duct 220 without a leakage of the second air, the size of the second hole 122 may be substantially the same as the size of the second opening 222.

The battery trays 100 may be accepted in the accepting spaces G by using a handle 111 along a D2 direction. Since the distance between the first and second ducts 210 and 220 is substantially the same as the height of the battery trays 100, a top surface of each battery tray 100 contacts a bottom surface of the second duct 220, and here, the second hole 122 and the second opening 222 may contact each other. Also, a bottom surface of each battery tray 100 contacts a top surface of the first duct 210, and here, the first hole 112 and the first opening 212 may contact each other. Thus, when the battery tray 100 is accepted in the accepting space G, a closed-loop path in which air flows may be formed.

The first air having flowed into the first duct 210 by the air intaking member 300 flows along the D1 direction, passes through the first opening 212 and the first hole 112, and then flows into the battery tray 100.

The first air having flowed into the battery tray 100 cools the battery trays 100 by passing through a space between the batteries 110 included in the battery trays 100. Since the batteries 110 included in the battery trays 100 are disposed substantially parallel along the D1 direction, the first air passes through the space between the batteries 110 along the D3 direction. While the first air passes through the batteries 110, the first air may absorb heat generated in the batteries 110.

A temperature of the second air, which, having passed through in the battery tray 100, has absorbed heat from the batteries 110, is higher than a temperature of the first air, and thus the second air is relatively light. The light second air may easily flow in an upward direction, i.e., in the D3 direction, and thus the second air may flow into the second duct 220 after passing through the second hole 122 and the second opening 222. After the second air flows into the second duct 220, the second air may be exhausted to the outside by the air exhausting member 400.

By forcibly circulating air by using the air intaking member 300 and the air exhausting member 400, the battery trays 100 are efficiently cooled. Also, by disposing the first and second ducts 210 and 220 on opposing sides of the battery trays (e.g., below and above, or left and right), it is possible to use a feature in which the second air, which, having passed through the battery trays 100, has absorbed heat, is relatively lighter than the first air. Thus, a cooling speed and a cooling efficiency with respect to the battery trays 100 may be further increased.

Figure 6:
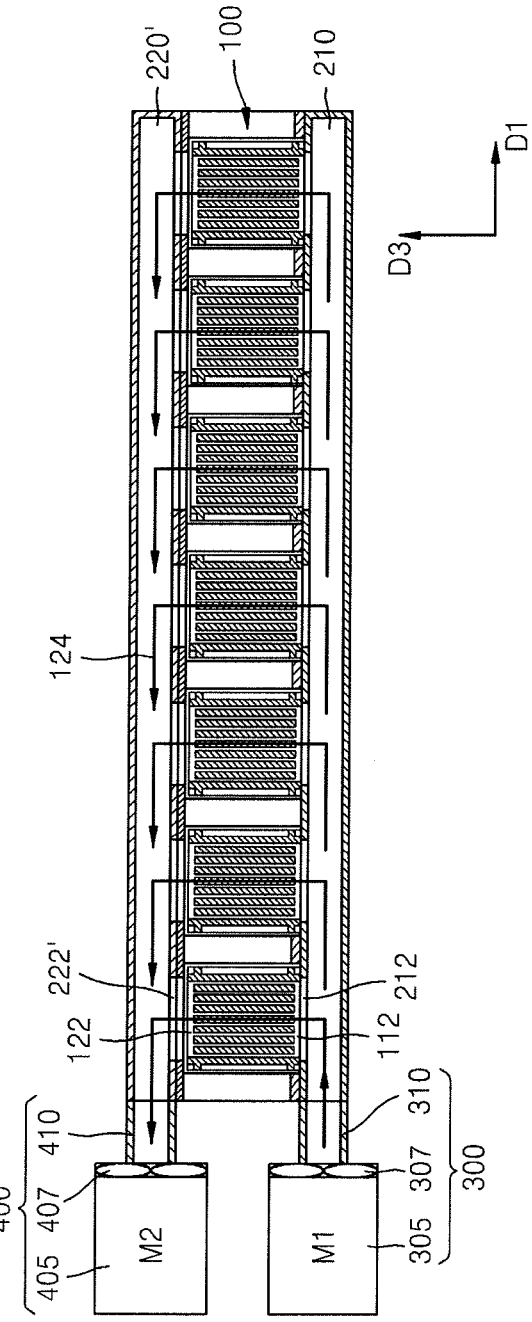
FIG. 6 is a perspective view illustrating a unit energy storage apparatus, that is, one row of the energy storage apparatus, in which a flow of air is shown, according to another embodiment.

FIG. 6 is a perspective view illustrating a unit energy storage apparatus, that is, one row of the energy storage apparatus 1, in which a flow of air is shown, according to another embodiment.

Referring to FIG. 6, the unit energy storage apparatus according to the present embodiment includes the battery trays 100 disposed in the row of accepting spaces RG, and the first duct 210 and the second duct 220 disposed in an upper region and a lower region of the row of accepting spaces RG, respectively. The present embodiment is substantially the same as the previous embodiment of FIGS. 4 and 5 in that the top surface of each battery tray 100 contacts the bottom surface of the second duct 220 when the battery trays 100 are accepted in the accepting spaces G and thus the second hole 122 and the second opening 222 may contact each other. Furthermore, the two embodiments are similar to each other in that the bottom surface of each battery tray 100 accepted in the accepting spaces G contacts the top surface of the first duct 210 and thus the first hole 112 and the first opening 212 may contact each other, whereby a path in which air may flow is formed.

However, the FIG. 6 embodiment is different from the previous embodiment of FIGS. 4 and 5 with respect to an air flow direction in the second duct 220. In the present embodiment, an intaking unit of the first duct 210 and an exhausting unit of the second duct 220 are arranged at substantially the same side of the energy storage apparatus 1 or the battery trays 100. In this embodiment, air that passes the first duct 210, the battery trays 100, and the second duct 220 may have a "⌐"-shaped path 124 as shown in FIG. 6. Although FIG. 6 shows that the first and second ducts 210 and 220 are located on the left side of the energy storage apparatus 1 or the battery trays 100, they can be located on other sides (e.g., right, upper or lower side thereof).

According to at least one of the disclosed embodiments, the battery trays may be accepted and structurally modularized, and each of the battery trays may be efficiently cooled.

It should be understood that the disclosed embodiments described therein should be considered in a descriptive sense only and not for purposes of limitation. Descriptions of features or aspects within each embodiment should typically be considered as available for other similar features or aspects in other embodiments.

What is claimed is:

1. An energy storage apparatus comprising:
    a plurality of battery trays arranged substantially parallel to each other so as to form at least one row;
    a first duct located at a first side of the battery trays, wherein a plurality of first openings are formed in the first duct;
    a second duct located at a second side of the battery trays, wherein a plurality of second openings are formed in the second duct, and wherein the first and second sides are different from each other;
    an air intake configured to forcibly intake air into the first duct; and
    an air exhaust configured to forcibly exhaust air from the second duct to the outside of the energy storage apparatus,
    wherein first and second holes are formed in each of the battery trays, wherein the first hole faces one of the first openings, and wherein the second hole faces one of the second openings.

2. The energy storage apparatus of claim 1, wherein the first and second ducts are disposed substantially parallel with each other, and wherein the battery trays are interposed between the first and second ducts.

3. The energy storage apparatus of claim 1, wherein the first and second ducts are disposed to be adjacent to the battery trays.

4. The energy storage apparatus of claim 1, wherein the first and second sides are opposing each other.

5. The energy storage apparatus of claim 1, wherein the first duct is disposed below the at least one row of the battery trays, and wherein the second duct is disposed above the at least one row of the battery trays.

6. The energy storage apparatus of claim 1, wherein the battery trays are interposed between the first and second openings.

7. The energy storage apparatus of claim 1, wherein the first opening and the first hole have substantially the same size.

8. The energy storage apparatus of claim 1, wherein the second opening and the second hole have substantially the same size.

9. The energy storage apparatus of claim 1, wherein each of the battery trays has closed surfaces except for surfaces of the first and second holes.

10. An energy storage apparatus comprising:
 a plurality of battery trays arranged in a first direction;
 a first duct located at a first side of the battery trays, wherein a plurality of first openings are formed in the first duct; and
 a second duct located at a second side of the battery trays, wherein a plurality of second openings are formed in the second duct, wherein the first and second sides are different from each other, wherein at least one of the first openings is substantially aligned, in a second direction, with i) at least one of the second openings and ii) at least one of the battery trays, and wherein the second direction crosses the first direction,
 wherein first and second holes are formed in each of the battery trays, wherein the first hole faces one of the first openings, and wherein the second hole faces one of the second openings.

11. The energy storage apparatus of claim 10, further comprising:
 an air intake configured to provide air into the first duct; and
 an air exhaust configured to exhaust air from the second duct to the environment.

12. The energy storage apparatus of claim 11, wherein the air intake and air exhaust are located on the same side of the battery trays.

13. The energy storage apparatus of claim 11, wherein the air intake and air exhaust are located on opposite sides of the battery trays.

* * * * *